INVENTORS:
DE WITT R. PETTERSON
DELMONT K. SMITH
BY

ATTORNEY.

Fig. 2.

```
┌─────────────────────────────────────┐
│ Interlacing a set of Cellulosic     │
│ Fibers and a set of Elastic Stretch │
│ Yarns having a thermoplastic        │
│ Component to form a woven Fabric    │
└─────────────────────────────────────┘
                  │
                  ▼
┌─────────────────────────────────────┐
│ Substantially totally relaxing the  │
│ Woven Fabric by Wet finishing       │
│ techniques and drying the relaxed   │
│ Fabrics                             │
└─────────────────────────────────────┘
                  │
                  ▼
┌─────────────────────────────────────┐
│ Applying from about 1/2% to 12%     │
│ based on the weight of the Fabric   │
│ of a stabilizing resin              │
└─────────────────────────────────────┘
                  │
                  ▼
┌─────────────────────────────────────┐
│ Stretching the Fabric with the      │
│ resin thereon from about 5% to 100% │
│ of its relaxed width                │
└─────────────────────────────────────┘
                  │
                  ▼
┌─────────────────────────────────────┐
│ Heating the stretched Fabric to     │
│ stabilize the elastic stretch yarns │
│ and activate and cure the           │
│ stabilizing resin at the same       │
│ percent of stretch                  │
└─────────────────────────────────────┘
```

INVENTORS:
DEWITT R. PETTERSON
DELMONT K. SMITH
BY
ATTORNEY.

United States Patent Office 3,438,842
Patented Apr. 15, 1969

3,438,842
WOVEN STRETCH FABRIC AND METHODS OF MANUFACTURING THE SAME
De Witt R. Petterson, North Brunswick, N.J., and Delmont K. Smith, Long Meadow, Mass., assignors to Johnson & Johnson, a corporation of New Jersey
Continuation-in-part of application Ser. No. 416,412, Dec. 7, 1964. This application Oct. 20, 1967, Ser. No. 676,779
Int. Cl. D03d 9/00; D06m 3/12; D06c 3/00
U.S. Cl. 161—77                    8 Claims

ABSTRACT OF THE DISCLOSURE

A lightweight open woven dimensionally stable stretch fabric made from cellulose yarns in the warp direction and elastic stretch yarns in the filling direction of the fabric. The fabric is treated with a dimensional stabilizing resin to cross-link the cellulose. The elastic stretch yarns have a thermoplastic component which is heat dimensionally stabilized. Both the dimensional stabilization and the heat stabilization being accomplished while the fabric is in a stretched condition of from about 5 to 100 percent of its completely relaxed width to give balanced and uniform linear stretch and recovery characteristics to the fabric.

---

This application is a continuation-in-part application of my co-pending application Ser. No. 416,412, filed Dec. 7, 1964, now abandoned.

This invention generally relates to open woven stabilized stretch fabrics of cellulose fibers or blends of cellulose fibers with other fibers and to methods of manufacturing the same, and more particularly to such open woven stretch fabrics which are both resin stabilized and heat stabilized to produce fabrics which have improved stretch and recovery characteristics and are dimensionally stable.

Various types of stretch fabrics have been known in the art. Generally such stretch fabrics are produced by slack mercerization of the fabric, weaving the fabric using high twist yarns, using texturized synthetic yarns, covered rubber yarns, spandex yarns, etc., in one direction in the fabric, or other known techniques for producing fabrics having stretch characteristics. Many of these stretch fabrics are resin treated with a thermosetting or crosslinking resin or other wash-wear resins to stabilize the fabric, reduce its shrinkage and make it generally suitable for the wash-wear industry.

Generally in the tightly woven fabrics, e.g., 80 x 80 count or higher, the dimensional stabilization of the stretch type fabrics of the higher count is not difficult. It appears that the tightness of the weave itself produces a relatively stable fabric. However, when weaving open woven cellulosic fabrics of about 44 x 36 count or even lighter, the openness of the weave produces an unstable fabric and when such fabrics also have stretch characteristics, they are extremely difficult to dimensionally stabilize due to the combination of stretch and openness of weave. Generally the prior art open woven stretch type fabrics, though in some instances they may stretch in a linear relationship that is uniform, their recovery does not have that same linear type relationship but will recover in a non-uniform manner. In many instances even the stretching characteristics are not linear. However, the fabrics of the present invention do have uniform, linear stretch characteristics, and also have substantially the same uniform, linear recovery characteristics. Furthermore, the fabrics of the present invention have a dimensionally stable open weave.

The light weight open woven dimensionally stable cellulosic stretch fabric of the present invention comprises a first set of cellulosic yarns. This first set of yarns runs in the warp direction in the final fabric. Interlaced, i.e., woven, with this first set of yarns is a second set of yarns running in the filling direction of the fabric. The second set of yarns are stretch yarns having an elasticity and containing a thermoplastic stretch fiber component; by thermoplastic component it is meant that the elastic stretch yarns may be stretched and set by heat in the stretched condition so that they do not return to the original non-stretched condition. The woven fabric has from about ½% to 12% by weight of the fabric of a stabilizing resin, such as, thermosetting resins, crosslinking resins, or other suitable stabilizing resins uniformly distributed throughout the fabric. The second set of yarns containing the thermoplastic component are stabilized with heat in a partially stretched condition and the entire fabric is resin stabilized in this same partially stretched condition. Hence, the stretch yarns are stabilized and the fabric resin stabilized in balance so that the resulting fabric has uniform and similar linear stretch and recovery characteristics.

In carrying out the process of the present invention, a first set of cellulosic yarns is interlaced with a second set of elastic stretch yarns containing a thermoplastic stretch fiber component. The above-described woven fabric is substantially completely relaxed by wet finishing the fabric by desizing, scouring, bleaching, or combinations of these treatments. It is important that the fabric be substantially completely relaxed prior to being both heat and resin stabilized. The relaxed fabric is dried and from about ½ to 12% by weight of the fabric of a stabilizing resin is applied by impregnation or other suitable means to the relaxed fabric. The relaxed fabric with the stabilizing resin thereon is stretched from about 5% to 100% or even higher and preferably from about 50% to 100% of its relaxed width, and the fabric while in the stretched condition heated to a temperature to activate the resin and heat stabilize the fabric. For example, if a crosslinking resin is applied to the woven fabric, the resin is activated by the heat to crosslink the cellulose, and heat stabilize the set of yarns containing the thermoplastic component to produce an open woven dimensionally stable stretch cellulosic fabric having uniform and similar linear stretch and recovery characteristics.

In order to describe the invention more specifically, reference is now made to the accompanying drawings in which:

FIGURE 3 is a flow sheet generally describing the method of the present invention.

Figure 1:
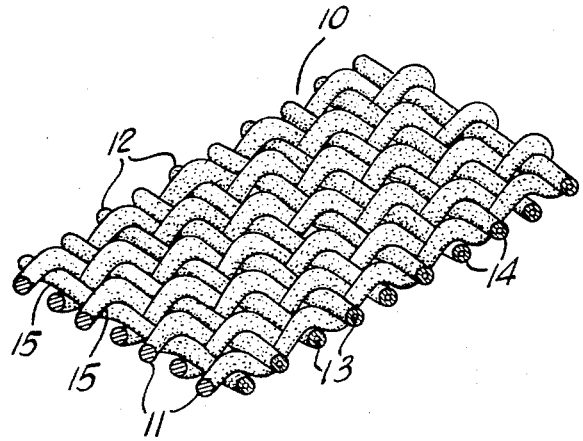
FIGURE 1 is a greatly enlarged isometric view of a small portion of one type of woven fabric of the present invention.

The base fabrics from which the stretch fabrics of the present invention are produced are woven from two sets of yarns. One set of yarns is cellulose yarns, and this set runs in the warp direction of the fabric. Generally the cellulose yarns are made of stable fibers and may be made of either the natural or artificial fibers, such as, cotton, viscose rayon, cuprammonium rayon, etc. The size of these yarns may vary from about 20s to 40s and degrees of twist of from about 3.5 to 7 have been found suitable for producing the fabrics of the present invention. The number of warp yarns per inch in the starting fabric may vary from 12 to 70.

The second set of yarns which run transverse of the first set or in the filling direction of the fabric and is woven therewith comprises elastic stretch yarns having a thermoplastic stretch fiber component. Suitable examples of such yarns would be spandex yarns either bare or covered with various fibers either by a core spinning or by a wrapping operation. Suitable covering fibers would be the vegetable fibers, such as, cotton; the artificial fibers, such as, rayon; or any of the various synthetic fibers. The elastic stretch yarns may be stretch nylon yarns, such as, texturized nylon or stretch polyester or polypropylene yarns or any of the various stretch yarns made from thermoplastic materials. Furthermore, any of the thermoplastic core yarns which have stretch characteristics and which are covered with non-thermoplastic materials may be used in accordance with the present invention. The number of yarns per inch in the filling direction of the original fabric may vary from about 8 to 50.

The fabric is woven by normal standard weaving techniques and may have anywhere from about 20 to 120 total warp and filling yarns per inch. Suitable fabrics would be fabrics having construction of anywhere from about 14 x 6 to about 44 x 36 or any of the light-weight open woven, that is, considerable spacing between yarn, type fabrics. Such fabrics are generally suitable as interlinings, linings, backings for quilting or for otherwise combining with other woven or knitted fabrics, etc.

The original fabric when removed from the weaving loom may have an original stretch in the filling direction of from about 10 to 15% of its width dependent on whether core spun or wrapped yarns are used in the filling direction and dependent on the width of the fabric as woven. When core spun yarns are used the stretch varies from 10 to 30% of fabric width and when wrapped yarns are used the stretch varies from 15 to 50% of fabric width.

In forming the base fabric, the two sets of yarns are woven in a plain weave, a sateen weave or any other desired weave.

The woven fabric is substantially completely relaxed by any of the various wet finishing techniques which do not chemically affect the cellulose component of the fabric. The wet finishing operations may be chosen from the group consisting of desizing, scouring, bleaching, or combinations of these treatments. All of these treatments are with aqueous baths of various chemicals. The fabric must be wet finished at a temperature less than that which will set the thermoplastic component of the stretch yarns. Temperatures of the wet finishing operation may be in the range of from 70° F. to 250° F. The water in the above mentioned wet finishing operations relaxes the yarns and hence the fabric, and removes any strains in the fabric which may be placed in the fabric either by the spinning or weaving operations. As in most processes of this type the degree of relaxation is a function of the time and temperature under which the fabric is treated. The lower the temperature the longer the time of treatment required to relax the fabric.

The wet finished fabric is dried and stabilizing resin applied to the fabric. There are various types of stabilizing resins which may be used, suitable examples of these are the crosslinking resins, thermosetting resins, wash and wear type resins, etc., e.g., urea formaldehyde, melamine formaldehyde, epichlorohydrin, divinyl sulfone, triazone or combinations of such resins either with themselves or with various thermoplastic or other type resins. From about ½% to about 12% by weight of the fabric of the stabilizing resin is placed on the fabric and preferably from about 2 to 6% of such resin by weight of the fabric is placed thereon. The fabric is then stretched to a portion of its total stretch and heat applied to activate the stabilizing resin, that is, crosslink the cellulose, and to heat stabilize the thermoplastic component of the elastic stretch yarns.

The fabric may be stretched from about 5% to 100% or higher of its relaxed width and preferably from about 50% to 100% of its relaxed width and is resin and heat stabilized in that stretched condition.

Referring to the drawings in FIGURE 1, there is shown a woven fabric 10 of the present invention having a set of cellulosic yarns 11 interlaced with a set of elastic stretch yarns 12 which are core spun yarns having a spandex core 13 around which are cotton fibers 14. The stretch yarns run in a transverse direction to the set of cellulosic yarns. Uniformly applied over the entire fabric is a stabilizing resin 15 and both the resin and thermoplastic component of the stretch yarns are stabilized by heat while the fabric is in a partially stretched condition.

Figure 2:
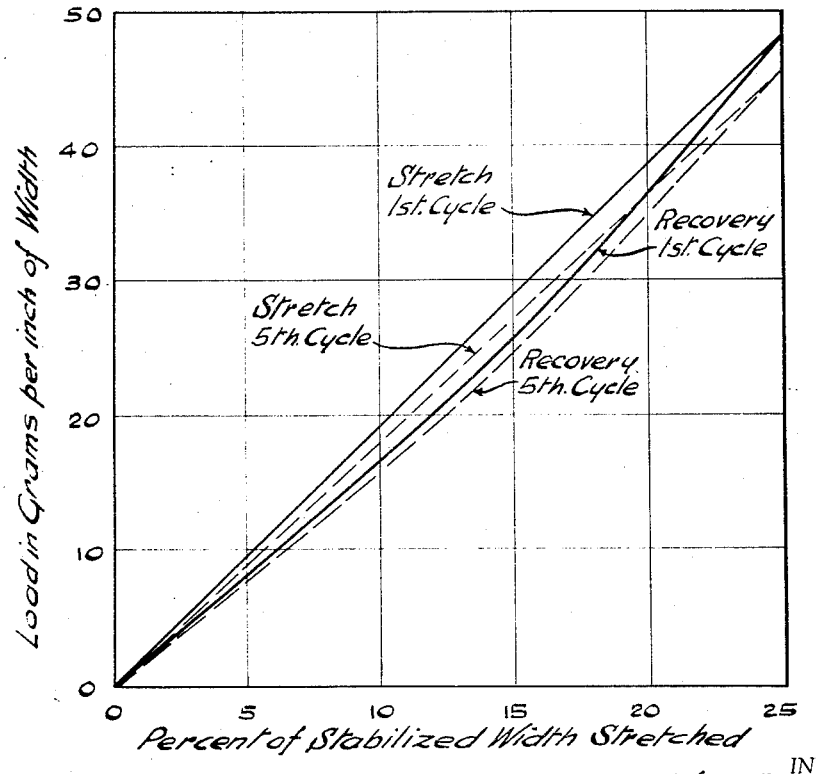
FIGURE 2 is a graph of the stretch and recovery characteristics of a fabric of the present invention at the 1st and 5th cycle of stretch in which the percent of stretch forms the abscissa and the work used to stretch the fabric, the ordinate of the graph.
Figure 2:
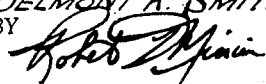

Referring to FIGURE 2 there is shown a graph of the stretch and recovery characteristics of a fabric of the present invention. The percent of stretch is plotted as the abscissa of the graph and the work used in grams per inch of width to produce the precent of stretch is plotted along the ordinate of the graph. The stretch and recovery curves for both the 1st and 5th cycle are substantially linear, the 1st cycle is shown by the continuous line and the 5th cycle by the broken line. As may be seen from the graph, there is little loss in the stretch and recovery characteristics of the fabric after 5 cycles.

The method of producing the fabric of the invention in accordance with this invention will be more fully described in conjunction with FIGURE 3 in which a set of cellulose yarns and a set of elastic stretch yarns having a thermoplastic stretch fiber component are woven with one set running in a transverse direction to the other set (Box 1). The two sets are interlaced by any of the known weaving techniques. The woven fabric is wet finished, as previously described, and dried (Box 2). From about ½ to 12% and preferably from about 2 to 6% by weight of the fabric of the stabilizing resin as previously described is uniformly applied to the wet finished fabric (Box 3). The resin may be applied by any of the techniques well known in the art, such is impregnation, saturation, sprayin, etc. The resin-treated fabric is stretched from about 5% to 100% or more of its relaxed width (Box 4). This may be done by passing the fabric through a tenter frame or by similar stretching means. In all instances the fabric is not stretched to its full capacity but is stretched to some degree less than its full stretching capacity. While in this stretched condition, the fabric is heated from about 325° F. to about 450° F. for a period from about 10 seconds to 2 minutes (Box 5). The elevated temperature heat stabilizes the thermoplastic component of the elastic stretch yarns and also activates the stabilizing resin, and if a crosslinking resin is used, crosslinks the cellulosic content of the woven fabric. The fabric is then relaxed and has balanced stretch and recovery characteristics and is dimensionally stable.

The final fabric will have from about 12 to 70 warp yarns per inch and from about 8 to 50 filling yarns per inch. Hence, the final fabric is still an open woven lightweight fabric, however, it now has considerable stretch in the widthwise direction and is unexpectedly stable; that is, it does not distort out of shape because of the openness of the weave. Surprisingly the final fabric will have a uniform and balanced stretch in the widthwise direction of from about 20 to 100% of its width. The stretch will be linear; i.e., equal increments of force to stretch will produce equal increments of stretch and furthermore the recovery properties of the fabric will be similar to these stretch properties.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto. The percentages indicated are by weight unless specifically stated otherwise.

Example I

A fabric is woven 50½ inches wide in the reed having a count of 44 x 12. The warp yarns used are all cotton fiber and the filling yarns used are spandex yarn, single wrapped with a combed cotton yarn. The weight of the fabric is 7.08 yards per pound. The woven fabric is desized and bleached, during which it relaxes to a width of about 18 inches. The fabric is pulled out from this relaxed width on a tenter frame and dried at a width of about 30 inches. A stabilizing resin is padded on to this fabric to about 80% by weight of the fabric of wet pick-up, the stabilizing resin bath comprises 9% by weight of a urea formaldehyde resin sold by American Cyanamid under the trade name "Resin 52," 1% by weight of a zinc nitrate catalyst, 5% by weight of an acrylic resin emulsion sold by Polymer Industries under the trade name "Polycryl 7F1," and the remainder water. The fabric is then stretched in the width wise direction to approximately 36 inches or 100% from its relaxed condition, and heated to a temperature of 380° F. for about 30 seconds. The elevated temperature activates and cures the thermosetting resin and heat stabilizes the spandex yarn. The resultant fabric has excellent, uniform linear stretch and recovery characteristics, and has good dimensional stability upon washing and dry cleaning.

The graph FIGURE 2 shows the stretch and recovery characteristics of the fabric (the first and fifth cycle to 25% stretch are shown).

Example II

A fabric is woven 40 inches wide in the reed having a count of 45 x 10. The warp yarns are all cotton fiber and the filling yarns are spandex yarn, single wrapped with a combed cotton yarn. The weight of the fabric is 10.28 yarns per pound. The woven fabric is desized and bleached, during which it relaxes to a width of about 18 inches. The fabric is pulled out from this relaxed width on a tenter frame and dried at a width of about 30 inches. A stabilizing resin is padded on to this fabric to about 80% by weight of the fabric of wet pick-up, the stabilizing resin bath comprises 9% by weight of a urea formaldehyde resin sold by American Cyanamid under the trade name "Resin 52," 1% of a zinc nitrate catalyst, 5% by weight of an acrylic resin emulsion sold by Polymer Industries under the trade name "Polycryl 7F1," and the remainder water. The fabric is then stretched in the widthwise direction to approximately 36 inches or 100% from its relaxed condition, and heated to a temperature of 400° F. for about 10 seconds. The elevated temperature activates and cures the thermosetting resin and heat stabilizes the spandex yarn. The resultant fabric has excellent, uniform linear stretch and recovery characteristics, and has good dimensional stability upon washing and dry cleaning.

Example III

A fabric is woven 59 inches wide in the reed having a count of 30 x 10. The warp yarns used are all cotton fiber, and the filling yarns used are a spandex yarn, core spun around with cotton fiber. The weight of the fabric is 8.03 yards per pound. The fabric is desized and bleached, during which it relaxes to a width of about 21 inches. Thet fabric is pulled out from this relaxed width on a tenter frame and dried at a width of about 30 inches. A stabilizing resin is padded on to this fabric at about 80% by weight wet pick-up, the stabilizing resin bath comprises 9% by weight of a urea formaldehyde resin sold by the American Cyanamid Company under the trade name "Resin 52," 1% by weight of a zinc nitrate catalyst, and the remainder water. The fabric is then stretched in the widthwise direction to approximately 37 inches or 76% from its relaxed condition, and heated to a temperature of 400° F. for 15 seconds. The resultant fabric has excellent, uniform linear stretch and recovery characteristics and has good dimensional stability upon washing and dry cleaning.

Example IV

A 44 x 36 fabric is woven. The warp yarns are all cotton yarns size 30s and the filling yarns are nylon texturized yarns. The fabric is woven approximately 50 inches wide. The fabric is desized, bleached, and dried on a tenter frame to a width of about 26 inches. The stabilizing resin comprising 5% by weight urea formaldehyde with appropirate stabilizers and catalyst and the remainder water is padded onto this fabric to a wet pick-up of 70%. After padding the fabric, the fabric is stretched to approximately 40 inches or approximately 55%. The stretched fabric is heated to a temperature of 340° F. for a period of 15 seconds and the cotton crosslinked and the nylon texturized yarns heat stabilized. The resultant fabric has good uniform linear stretch and recovery characteristics and has good dimensional stability.

Example V

The procedures of Example III are followed as set forth therein with the exception that a divinyl sulfone thermosetting resin is substituted for the urea formaldehyde resin. Comparable results are obtained.

Example VI

The procedure of Example I is followed as set forth therein with the exception that rayon yarns are substituted for the cotton yarns of Example I. Comparable results are obtained.

Example VII

The procedure of Example I is followed as set forth therein with the exception that core spun nylon texturized yarns are substituted for the core spun spandex yarns. Comparable results are obtained.

What is claimed is:

1. A light weight open woven dimensionally stable stretch fabric having from 20 to 120 total warp and filling yarns per inch and balanced and uniform linear stretch and recovery characteristics comprising: a first set of cellulose yarns running in the warp direction of the fabric, a second set of elastic stretch yarns having a thermoplastic stretch fiber component running in the filling direction of said fabric, said first set and second set being interlaced, from about 0.5% to 12% by weight of the fabric of a dimensionally stabilizing crosslinking resin uniformly distributed throughout the fabric, said second set of yarns being heat dimensionally stabilized in a partially stretched condition of from about 5% to 100% of the completely relaxed width of said fabric and said fabric being resin dimensionally stabilized in the same partially stretched condition whereby said fabric has from about 20% to 100% stretch in the filling direction.

2. A light weight open woven dimensionally stable stretch fabric according to claim 1 wherein the first set of yarns are cotton yarns.

3. A light weight open woven dimensionally stable stretch fabric according to claim 1 wherein the first set of yarns are cotton yarns and the second set of yarns are spandex yarns covered with cotton fibers.

4. A light weight open woven dimensionally stable stretch fabric according to claim 1 wherein the first set of yarns are cotton yarns and the second set of yarns are texturized nylon yarns.

5. A process for producing a light weight open woven stretch fabric said fabric having from about 20 to 120 total warp and filling yarns per inch comprising: (a) weaving two sets of yarns, the first set of yarns being cellulose yarns running in the warp direction of the fabric and having from about 12 to 70 yarns per inch and the second set of yarns being elastic stretch yarns having a thermoplastic stretch fiber component and running in the filling direction of the fabric and having from about 8 to 50 yarns per inch, to form a woven fabric having from about 10% to 50% stretch in the filling direction, (b) wet finishing the woven fabric at a temperature of from 70° F. to 250° F. to substantially relax the stretch yarns by treating the fabric with an aqueous treatment selected from the class of desizing, scouring, bleaching, and combinations thereof, (c) applying from about 0.5% to 12% by weight of the fabric of a dimensionally stabilizing crosslinking resin for cellulose to said wet finished fabric, (d) stretching said fabric with the stabilizing resin thereon from about 5% to about 100% of its relaxed width, and (e) heating the fabric while in the stretched condition to a temperature of from about 325° F. to 450° F. for a period of from about 10 seconds to 2 minutes to resin dimensionally stabilize the fabric and heat stabilize the yarns containing the thermoplastic component in the stretched condition whereby an open woven dimensionally stable stretch fabric having balanced and uniform linear stretch and recovery characteristics and from about 20% to 100% stretch in the filling direction is produced.

6. A process according to claim 5 wherein the first set of yarns are cotton yarns and the second set of yarns are spandex yarns covered with cotton fibers.

7. A process according to claim 5 wherein the dimensionally stabilizing cross-linking resin is a urea-formaldehyde resin.

8. A process according to claim 5 wherein the fabric is wet finished by desizing and bleaching.

References Cited

UNITED STATES PATENTS

| | | | |
|---|---|---|---|
| 2,153,964 | 4/1939 | Lejeune | 8—125 X |
| 2,384,936 | 9/1945 | Lilly et al. | 8—130.1 X |
| 3,145,132 | 8/1964 | Seltzer | 161—90 |
| 3,146,575 | 9/1964 | Lund et al. | 8—130.1 X |
| 3,290,752 | 12/1966 | Ormand | 8—130.1 X |
| 3,316,610 | 5/1967 | Marock | 161—76 X |

ROBERT F. BURNETT, *Primary Examiner.*

R. L. MAY, *Assistant Examiner.*

U.S. Cl. X.R.

161—91; 28—72, 76; 8—114.5, 130.1